UNITED STATES PATENT OFFICE.

GEORGES ADOLPHE FREYSS, OF MULHOUSE, GERMANY, ASSIGNOR TO THE FABRIQUES DES PRODUITS CHIMIQUES DE THANN ET DE MULHOUSE.

PROCESS OF PURIFYING OILS OR FATS.

SPECIFICATION forming part of Letters Patent No. 542,758, dated July 16, 1895.

Application filed June 5, 1893. Serial No. 476,559. (No specimens.)

*To all whom it may concern:*

Be it known that I, GEORGES ADOLPHE FREYSS, a citizen of Alsatian Reichsland, residing in Mulhouse, Alsace, in the German Empire, have invented certain new and useful Improvements in Processes of Purifying Oils, Fats, and Analogous Substances for Alimentary Purposes, which improvement is fully described in the following specification.

It is well known that the products which impart to fats, oils, and other analogous substances—such, for example, as cocoa butter—their particular odor are removed more or less completely when they are submitted to the action of a current of steam; but the perfect purification or disinfection of these substances has not yet been accomplished, and in particular it has not been possible to render them applicable to alimentary purposes by the treatment with steam. The reason for the unfitness of such products for alimentary purposes is that while the steam treatment removes more or less completely the specific odor or flavor, it nevertheless leaves therein a certain rancidness or mustiness of taste and smell. The reason of this objectionable property has not heretofore been understood, and no means have been proposed, so far as I am aware, for removing it.

The present invention is based on the discovery that the specified rancidity or mustiness is due to the action of the oxygen of the air mixed with the steam or contained in the receptacles, and that it can be altogether obviated by applying the current of steam, carrying away the specific impurity of odor under exclusion of air. In this manner cocoa butter and analogous fatty products can be obtained chemically pure, inodorous, and entirely suitable for alimentary purposes.

According to my present invention, therefore, the fats, oils, wax, and analogous substances are rendered absolutely odorless and flavorless by operating upon them by means of either saturated or superheated steam under exclusion of air. For this purpose the said substances are heated in suitable closed vessels so as to melt them, and the air is exhausted by introducing a current of an inert gas, such as nitrogen and the like. When all the air has thus been removed the temperature is raised, according to circumstances, to from 110° to 220° centigrade, and a current of steam, either saturated or superheated, is introduced into the mass until the water of condensation from the steam is free from odor. This result having been obtained, the steam-supply valve is closed, and the mass is allowed to cool in the presence of inert gas.

When fats are operated upon that are easily saponified by means of steam—as, for example, oleomargarine and other animal fats—the use of steam is dispensed with and the products that cause the odors are removed by means of a current of an inert gas.

It will therefore be understood that my invention consists essentially in purifying alimentary fats and like products, under exclusion of air, by means of steam at a temperature of from 110° to 220° centigrade, inert gas being a substitute for steam in the exceptional case referred to above.

This process is not analogous to distillation processes, wherein it is often customary to operate *in vacuo* to lower the point of ebullition, and wherein the useful product is distilled off.

In order to render the treatment more expeditious the melted fats may be formed into an emulsion by means of an alkaline bisulphite, such as bisulphite of soda of about 40° Baumé with twenty per cent. of water. In making the emulsion I use from two to ten per cent. of the bisulphite. The fats are then treated as above described, after which the mixture is allowed to rest and the bisulphite solution, which will have dissolved most of the products that caused the odor, is removed and the fat finally washed with water.

What I claim as my invention, and desire to secure by Letters Patent, is—

1. The herein described process for the purification of fats, oils and analogous products so as to render them fit for alimentary purposes, said process consisting in the treatment of the products in question at a temperature of from 110° to 220° centigrade, by means of a gaseous purifying agent, as specified, the entire process being conducted under exclusion of air, as set forth.

2. The herein described process for the purification of fats, and analogous products for alimentary purposes, consisting in forming an emulsion of the product with alkiline bisulphite, and then treating the emulsion at a temperature of from 110° to 220° centigrade,
5 by means of a gaseous purifying agent, as specified, under exclusion of air, as set forth.

In witness whereof I have hereunto signed my name in the presence of two subscribing witnesses.

GEORGES ADOLPHE FREYSS.

Witnesses:
 E. NOELTING,
 D. NIEBEKER.